C. J. LETZING.
CHUCK.
APPLICATION FILED JULY 2, 1917.

1,263,081. Patented Apr. 16, 1918.

INVENTOR:
Christian J. Letzing
By
HIS ATTORNEYS

UNITED STATES PATENT OFFICE.

CHRISTIAN J. LETZING, OF BOSTON, MASSACHUSETTS.

CHUCK.

1,263,081.　　　　Specification of Letters Patent.　　Patented Apr. 16, 1918.

Application filed July 2, 1917. Serial No. 178,177.

*To all whom it may concern:*

Be it known that I, CHRISTIAN J. LETZING, of Boston, in the county of Suffolk and State of Massachusetts, a citizen of the United States, have invented a new and useful Improvement in Chucks, of which the following is a specification.

The purpose of my invention is to provide a chuck adapted especially to support or hold a gear in a lathe, though it may be otherwise used, and my invention relates especially to the means for attaching a gear or the like to the plate against which it rests.

In its preferred or usual form my chuck comprises a stud adapted to be set into the rotary member of a lathe and a plate mounted thereon, said plate having one or more stationary clamping members against which the gear or other piece of work may be clamped by a movable clamping member.

My invention will be understood by the drawings, in which—

Figure 1 shows the rear view of a chuck embodying my invention;

Fig. 2 a front view thereof with the indication of a gear, which is attached thereto, in dotted lines.

Figure 5:
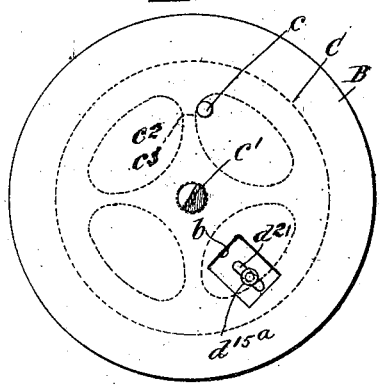

Fig. 5 being a face view thereof, the gear being indicated in dotted lines, and

Figure 4:
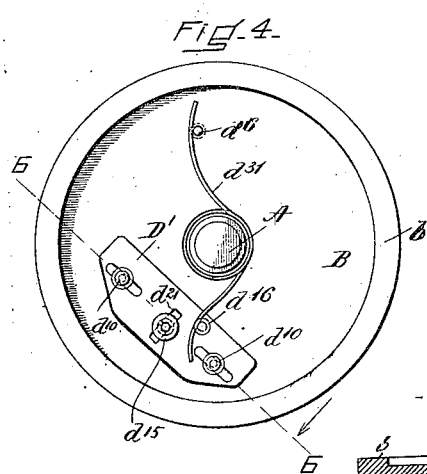
Fig. 4 is a rear view of another embodiment of my invention.
Figure 6:
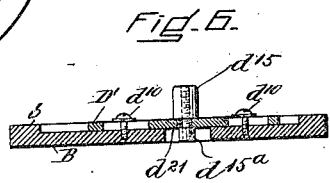

Fig. 6 being a section on the line 6—6 of Fig. 4.

Figure 7:
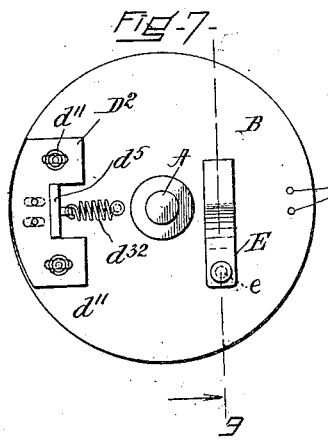
Figure 8:
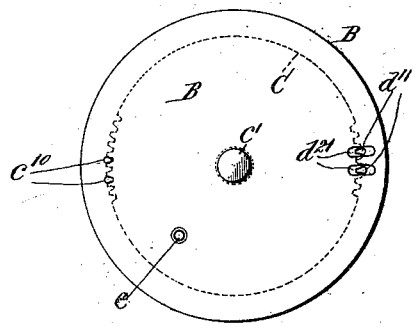

Figs. 7 and 8 are rear and front views of another form of my invention.

Figure 9:
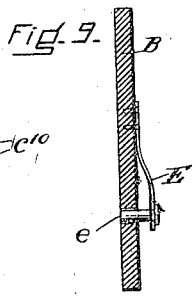

Fig. 9 is a section on line 9—9 of Fig. 7.

In each view A is a stud or handle. In the form shown it is adapted to set into the ordinary jaws on the end of the lathe spindle so that the device may be held and rotated thereby, or it may be held in a vise or otherwise. B is a plate, preferably circular, which is integral with, or firmly attached to, the stud A. As shown in Fig. 4, the plate is slightly dished forming a rim as at $b$, this rim serving in this instance to provide a recess within which the work mechanism is mounted.

Figure 1:
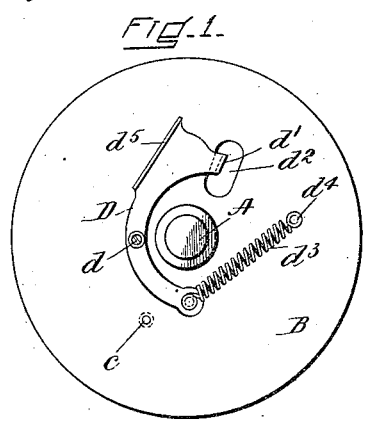
Figure 3:
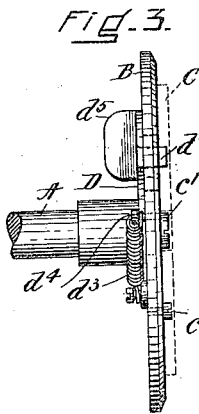
Fig. 3 is an edge view of this form of chuck.
Figure 2:
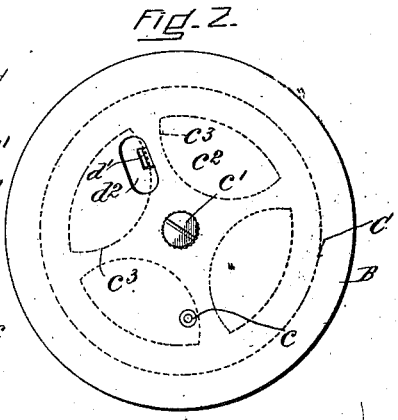

The stationary member of the clamp is shown at $c$. It comprises a pin or screw which projects somewhat from the front face of the plate and is sufficiently high to serve as an abutment against which a properly recessed portion of the gear may engage. $c^1$ is a centering pin which is shown in the form of a screw and is of sufficient size to fill the central opening of the gear or work C, thus centering the gear. The gear shown in Figs. 2 and 5 has openings in it, $c^2$, leaving spokes $c^3$ which radiate from the hub to the rim. The number of these openings is immaterial, but the stationary member $c$ of the clamp is located to engage one of the spokes, while the other may be engaged by what I have termed a clamping member D. The movable or clamping member D is so located as to engage another of the spokes so as to clamp the gear against the stationary member $c$ as below described. In Fig. 1 this clamping member D is pivoted on the rear face of the plate as at $d$ and comprises a lever having a lip shown at $d^1$, which projects outward through an opening $d^2$ in the plate. The rear end of the lever $d$ has attached to it a spring $d^3$, the other end of which spring is attached to a pin $d^4$ in the plate. $d^5$ is a thumb piece projecting outwardly from the lever so that the lever may be conveniently operated.

To use this form of chuck the gear is placed upon the centering pin $c^1$ in such a manner that the stationary member $c$ will project through one of the openings $c^2$, while the clamping member will project through another of the openings $c^2$. In order, however, that the clamping member D may pass through this opening $c^2$ it is necessary to move it against the stress of the spring $d^3$ so that it will register with one of the openings $c^2$, and then release it so that it will rotate the gear slightly about its axis $c^1$ and cause it to engage the pin $c$. Thus the gear will be clamped between the stationary member $c$ and the lip $d^1$ of the clamping member D.

In Figs. 4, 5 and 6 another form of my invention is shown in which the spring $d^{31}$ encircling the stud A engages a stationary pin $d^6$ at one end and at its other end another stationary pin $d^{16}$ mounted on a slide $D^1$, which is slotted and is held against the rear of the plate B by means of suitable rivets or screws $d^{10}$ passing through the slots. The thumb piece $d^{15}$ in this case comprises a pin which projects through a slot $d^{21}$ in the slide $D^1$ and serves as the clamping member. It is made in two parts; one part $d^{15a}$ screws into the thumb piece proper $d^{15}$ so that it binds the thumb piece against the slide. This enables the position of the thumb piece to be adjusted in the slot $d^{21}$ toward and from the periphery of the plate and hence makes the device adjustable for gears of different sizes. The plate B itself in this case has an opening $b$ of sufficient size to allow for any ordinary adjustment and movement of the projecting end of the thumb piece. As before, $c$ is the stationary member, i. e., a pin or screw projecting outward from the face of the plate, the gear or work C having, as before, a central opening fitting over the screw $c^1$, which is concentric with the plate. It will be noted from Fig. 5 that the slide $D^1$ moves at an angle to the radius of the plate so that when, after being retracted against the force of the spring $d^{31}$, the gear C being in place, it is released, it will engage a spoke $c^3$ in the gear and force the gear around its axis $c^1$ so that another spoke $c^3$ will engage the stationary member $c$.

It will be seen that these two forms of my invention are alike in that in each case a spring clamping member clamps a spoke of the gear against a stationary member or pin $c$.

In Figs. 7 and 8 another form of my invention is shown in which there are two pins $c^{10}$ in addition to the stationary member $c$, which are of such shape and so placed as to engage the teeth on the periphery of the gear C, a few only of the teeth being shown. In this case, as before, the gear has a central opening which fits over the member $c^1$. Preferably on the side of the plate B, opposite the pins $c^{10}$, is a slide-piece $D^2$ similar to the slide-piece $D^1$ in Fig. 4, and is normally drawn toward the center of the stud A by means of a spring $d^{32}$. This slide is slotted and through these slots pass guide pins $d^{11}$, these pin allowing the slide-piece to have a movement parallel with the radius of the plate. In this case the slide-piece is provided with two pins which pass through openings $d^{21}$ in the plate and project sufficiently far therethrough to lie between two of the gear teeth on the periphery of the gear.

In order to remove the gear quickly from the plate I prefer to provide a spring E attached at one end to the rear of the plate B and having at the other end a pin $e$ which passes through the plate, the end of the pin being flush with the face of the plate. By putting the pin through the plate it will push the gear out of the chuck and when released will return to its normal position.

Other forms of my invention will occur to those skilled in the art, its essentials comprising a plate having a stationary member with which a portion of the gear may be caused to engage by a clamping member which shall be movable in order to allow the gear to be clamped.

What I claim as my invention is:—

1. The chuck above described, comprising a plate, means for holding said plate, said plate having a stationary member projecting at right angles from the face thereof, a spring-controlled slide adapted to coöperate with said stationary member and a centering pin located between said stationary member and said slide whereby the work will be centered by said centering pin and will be clamped by said slide against said stationary member.

2. The chuck above described, comprising a plate, means for holding said plate, said plate having a stationary member projecting from one side thereof, a slide member located on the opposite side thereof, said plate having an opening therein, and said slide having a clamping means projecting through said opening and adapted to clamp the work against said stationary member.

3. The chuck above described, comprising a plate having a centering pin, means for holding said plate, said plate having a stationary member projecting from one side thereof, a slide member located on the opposite side thereof, said plate having an opening therein, and said slide having a clamping means projecting through said opening and adapted to clamp the work against said stationary member, said centering pin being adapted to serve as an axis around which the work may be adjusted by the clamping means to engage the stationary member.

CHRISTIAN J. LETZING.